United States Patent
Tian et al.

(10) Patent No.: US 9,679,387 B2
(45) Date of Patent: Jun. 13, 2017

(54) DEPTH-WEIGHTED GROUP-WISE PRINCIPAL COMPONENT ANALYSIS FOR VIDEO FOREGROUND/BACKGROUND SEPARATION

(71) Applicant: Mitsubishi Electric Research Laboratories, Inc., Cambridge, MA (US)

(72) Inventors: Dong Tian, Boxborough, MA (US); Hassan Mansour, Boston, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/620,324

(22) Filed: Feb. 12, 2015

(65) Prior Publication Data
US 2016/0239980 A1    Aug. 18, 2016

(51) Int. Cl.
| G06T 7/00 | (2017.01) |
| G06T 7/11 | (2017.01) |
| G06T 7/143 | (2017.01) |
| G06T 7/215 | (2017.01) |
| G06T 7/194 | (2017.01) |

(52) U.S. Cl.
CPC .............. G06T 7/0081 (2013.01); G06T 7/11 (2017.01); G06T 7/143 (2017.01); G06T 7/194 (2017.01); G06T 7/215 (2017.01); *G06T 2207/10016* (2013.01); *G06T 2207/10028* (2013.01)

(58) Field of Classification Search
None
See application file for complete search history.

(56) References Cited

U.S. PATENT DOCUMENTS

| 5,500,904 | A | * | 3/1996 | Markandey | G06T 7/2066 382/103 |
| 6,081,278 | A | * | 6/2000 | Chen | G06T 17/00 345/473 |
| 6,611,268 | B1 | * | 8/2003 | Szeliski | G06T 13/80 345/420 |
| 6,956,573 | B1 | * | 10/2005 | Bergen | G06F 17/30802 345/473 |
| 8,131,012 | B2 | * | 3/2012 | Eaton | G06K 9/00771 340/573.1 |

(Continued)

OTHER PUBLICATIONS

"Depth Extended Online RPCA with Spatiotemporal Constraints for Robust Background Subtraction," Sajid Javed et al, 21st Korea-Japan Joint Workshop on Frontiers of Computer Vision (FCV), 2015, Mokpo, Jan. 28-30, 2015, pp. 1-6.*

(Continued)

*Primary Examiner* — Utpal Shah
(74) *Attorney, Agent, or Firm* — Gene Vinokur; James McAleenan; Hironori Tsukamoto

(57) ABSTRACT

A method separates foreground from background in a sequence of images, by first acquiring the sequence of images and a depth map of a scene by a camera. Groups of pixels are determined based on the depth map. Then, the sequence of images is decomposed into a sparse foreground component, and a low rank background component, according to apparent motion in the sequence of images, and the groups.

17 Claims, 4 Drawing Sheets

(56) References Cited

U.S. PATENT DOCUMENTS

| | | | |
|---|---|---|---|
| 2003/0076990 A1* | 4/2003 | Brand | G06T 7/0071 382/154 |
| 2003/0091225 A1* | 5/2003 | Chen | G06K 9/20 382/145 |
| 2003/0235341 A1* | 12/2003 | Gokturk | G06K 9/00228 382/243 |
| 2004/0062439 A1* | 4/2004 | Cahill | G06T 5/50 382/173 |
| 2004/0247176 A1* | 12/2004 | Aucsmith | G06K 9/38 382/154 |
| 2008/0273751 A1* | 11/2008 | Yuan | G06K 9/32 382/103 |
| 2010/0141651 A1* | 6/2010 | Tan | G06T 7/0071 345/420 |
| 2011/0096832 A1* | 4/2011 | Zhang | G06T 7/0071 375/240.08 |
| 2011/0142289 A1* | 6/2011 | Barenbrug | G06T 7/0081 382/107 |
| 2012/0294362 A1* | 11/2012 | Sikora | H04N 19/82 375/240.14 |
| 2013/0136358 A1* | 5/2013 | Dedhia | G06T 7/0093 382/173 |
| 2013/0208948 A1* | 8/2013 | Berkovich | G06T 7/0071 382/103 |
| 2013/0279588 A1* | 10/2013 | Wu | H04N 19/00684 375/240.16 |
| 2013/0335528 A1* | 12/2013 | Vishwanath | H04N 13/026 348/46 |
| 2014/0072212 A1* | 3/2014 | Sorgi | G06T 7/0081 382/164 |
| 2014/0118494 A1* | 5/2014 | Wu | G06T 7/0065 348/44 |
| 2014/0241587 A1* | 8/2014 | Jung | G06T 7/2086 382/107 |
| 2014/0348421 A1* | 11/2014 | Urban | G06T 7/0081 382/164 |
| 2015/0063687 A1* | 3/2015 | Nadar | G06K 9/645 382/159 |
| 2015/0161818 A1* | 6/2015 | Komenczi | G06T 17/00 348/43 |
| 2015/0338204 A1* | 11/2015 | Richert | G01B 11/14 348/135 |
| 2015/0348274 A1* | 12/2015 | Ródriquez-Valderrama | G06T 7/0081 382/103 |
| 2016/0050343 A1* | 2/2016 | Kutz | H04N 5/144 348/239 |

OTHER PUBLICATIONS

Emmanuel J Candès, Xiaodong Li, Yi Ma, and John Wright, "Robust principal component analysis?," Journal of the ACM (JACM), vol. 58, No. 3, pp. 11, 2011.

Zaiwen Wen, Wotao Yin, and Yin Zhang, "Solving a low-rank factorization model for matrix completion by a nonlinear successive over-relaxation algorithm," Mathematical Programming Computation, vol. 4, No. 4, pp. 333-361, 2012.

Yuan Shen, Zaiwen Wen, and Yin Zhang, "Augmented Lagrangian alternating direction method for matrix separation based on low-rank factorization," Optimization Methods and Software, vol. 29, No. 2, pp. 239-263, 2014.

Nathan Srebro, Learning with matrix factorizations, Ph.D. thesis, Citeseer, 2004.

Junzhou Huang, Xiaolei Huang, and Dimitris Metaxas, "Learning with dynamic group sparsity," in Computer Vision, 2009 IEEE 12th International Conference on. IEEE, 2009, pp. 64-71.

Wei Deng, Wotao Yin, and Yin Zhang, "Group sparse optimization by alternating direction method," in SPIE Optical Engineering+ Applications. International Society for Optics and Photonics, 2013, pp. 88580R-88580R.

Zhangjian Ji, Weiqiang Wang, and Ke Lv, "Foreground detection utilizing structured sparse model via l1,2 mixed norms," in Systems, Man, and Cybernetics (SMC), 2013 IEEE International Conference on. IEEE, 2013, pp. 2286-2291.

Hassan Mansour and Anthony Vetro, "Video background subtraction using semi-supervised robust matrix completion," in Acoustics, Speech and Signal Processing (ICASSP), 2014 IEEE International Conference on. IEEE, 2014, pp. 6528-6532.

Gaile Gordon, Trevor Darrell, Michael Harville, and John Woodfill, "Background estimation and removal based on range and color," in Computer Vision and Pattern Recognition, 1999. IEEE Computer Society Conference on., 1999, vol. 2, pp. 464 vol. 2.

Michael Harville, Gaile Gordon, and John Woodfill, "Foreground segmentation using adaptive mixture models in color and depth," in Detection and Recognition of Events in Video, 2001. Proceedings. IEEE Workshop on. IEEE, 2001, pp. 3-11.

Enrique J Fernandez-Sanchez, Javier Diaz, and Eduardo Ros, "Background subtraction based on color and depth using active sensors," Sensors, vol. 13, No. 7, pp. 8895-8915, 2013.

* cited by examiner

Algorithm 1 Factorized RPCA algorithm to solve problem (2) – Benchmark

Require: Input data $B$, $\lambda$, $\mu$, error tolerance $\tau$, maximum iteration number $N$ 1: Init: $i \leftarrow 0$; $L_i$ and $R_i \leftarrow$ random matrix
2: repeat
3:     $L_{i+1} = (\mu(B - S_i) + Y_i)R_i(I + \mu R_i^T R_i)^{-1}$
4:     $R_{i+1} = (\mu(B - S_i) + Y_i)^T L_{i+1}(I + \mu L_{i+1}^T L_{i+1})^{-1}$
5:     $S_{i+1} = \mathcal{S}_{\lambda/\mu}(B - L_{i+1}R_{i+1}^T + \mu^{-1}Y_i)$
6:     $E = B - L_{i+1}R_{i+1}^T - S_{i+1}$
7:     $Y_{i+1} = Y_i + \mu E$
8:     $i \leftarrow i + 1$
9: until $i \geq N$ or $\|E\|_F \leq \tau$
10: return $L$, $R$, $S$, $i$ and $\|E\|_F$

*Fig. 3*
*Prior Art*

Algorithm 2 Depth-weighted group-wise PCA algorithm to solve problem (9) — Proposed in this invention

Require: Input data $B$, $\lambda$, $\mu$, error tolerance $\tau$, maximum iteration number $N$, and depth map $D$
1: Init: $i \leftarrow 0$, $L_i$ and $R_i \leftarrow$ random matrix, $G \leftarrow g(D)$
2: repeat
3:      $L_{i+1} = (\mu(B - S_i) + Y_i)R_i(I + \mu R_i^T R_i)^{-1}$
4:      $R_{i+1} = (\mu(B - S_i) + Y_i)^T L_{i+1}(I + \mu L_{i+1}^T L_{i+1})^{-1}$
5:      $S_{i+1,g} = S_{\lambda/\mu,g}(B_g - L_{i+1,g}R_{i+1,g}^T + \mu^{-1}Y_{i,g})$
6:      $E = B - L_{i+1}R_{i+1}^T - S_{i+1}$
7:      $Y_{i+1} = Y_i + \mu E$
8:      $i \leftarrow i + 1$
9: until $i \geq N$ or $\|E\|_F \leq \tau$
10: return $L$, $R$, $S$, $i$ and $\|E\|_F$

*Fig. 4*

DEPTH-WEIGHTED GROUP-WISE PRINCIPAL COMPONENT ANALYSIS FOR VIDEO FOREGROUND/BACKGROUND SEPARATION

FIELD OF THE INVENTION

The invention relates generally to image processing, and more particularly to separating foreground content from background content in a sequence of images.

BACKGROUND OF THE INVENTION

Foreground/background (FG/BG) separation can be used in applications such as video surveillance, human-computer interaction, and panoramic photography, where foreground content has a different motion than the background content. For example, FG/BG separation can improve object detection, object classification, trajectory analysis, and unusual motion detection leading to high level understanding of events represented in a sequence of images (video).

When robust principal component analysis (RPCA) is used for the separation, the RPCA assumes that an observed video signal $B \in \mathbb{R}^{m \times n}$ can be decomposed into a low rank component $X \in \mathbb{R}^{m \times n}$, and a complementary sparse component $S \in \mathbb{R}^{m \times n}$. In this case, in is the number of pixels in each frame, i.e. each column of the matrix corresponds to one frame, and n is the number of frames under inspection. Thus, the FG/BG separation can be formulated as an optimization problem for X and S:

$$(X, S) = \underset{X,S}{\operatorname{argmin}} \|X\|_* + \lambda \|S\|_1, \tag{1}$$

s.t.

$$B = X + S,$$

where $\|.\|_*$ is a nuclear norm of a matrix and $\|.\|_1$ is $l_1$-norm of a vectorization of the matrix, and $\lambda$ is a regularization parameter. The solution to the RPCA problem involves computing a full or partial singular value decomposition (SVD) at every iteration.

To reduce the complexity, several techniques, such as, Low-Rank Matrix Fitting (LMaFit). have been described using low rank factors and optimize over the factors in order to limit the computational complexity. Factorization of a matrix on the low-rank component represents $X = LR^T$, where $L \in \mathbb{R}^{m \times n}$, $R \in \mathbb{R}^{n \times r}$, and r≥rank(X).

The factorization-based RPCA method can be formulated and solved using an augmented Lagrangian alternating direction method (ADM) as follows:

$$(L, R, S, Y) = \underset{L,R,S,Y}{\operatorname{argmin}} \left( \frac{1}{2} \|L\|_F^2 + \frac{1}{2} \|R\|_F^2 + \lambda \|S\|_1 + <Y, E> + \frac{\mu}{2} \|E\|_F^2 \right), \tag{2}$$

where $\|.\|_F$ is a Frobenius norm of a matrix, $\lambda$ is a regularization parameter, Y is the Lagrange dual variable, $\mu$ is an augmented Lagrangian parameter, and $E = B - LR^T - S$. Note that the nuclear norm $\|X\|_*$ in equation (1) is replaced by $\frac{1}{2}\|L\|_F^2 + \frac{1}{2}\|R\|_F^2$ in equation (2), where $X = LR^T$, based on the observation that $$\|X\|_* = \underset{L,R}{\operatorname{inf}} \frac{1}{2}\|L\|_F^2 + \frac{1}{2}\|R\|_F^2, \tag{3}$$

s.t.

$$X = LR^T,$$

where T is a transpose operator.

FIG. 3 shows pseudocode of algorithm 1 for the iterations used to solve equation (2). Note in step 5, the soft-thresholding operator $$S_{\lambda/\mu}(r) = \operatorname{sign}(r)\max(|r| - \lambda/\mu, 0), \tag{4}$$

wherein $$r = B - LR^T + \frac{1}{\mu}Y$$

does not impose structure on the sparse component.

In recent years, structured sparsity techniques have been applied to the RPCA methods. Sparse techniques learn over-complete bases to represent data efficiently. In the art, a sparse matrix is a matrix in which most of the elements are zero. By contrast, if most of the elements are nonzero, then the matrix is considered dense. The fraction of zero elements (non-zero elements) in a matrix is called the sparsity (density). This is mainly motivated by the observation that sparse data are often not random located but tend to cluster.

For example, one learning formulation, called dynamic group sparsity (DGS) uses a pruning step in selecting sparse components that favor local clustering. Another approach enforces group sparsity by replacing the $l_1$-norm in equation (1) with a mixed $l_{2,1}$-norm defined as, $$\|S\|_{2,1} = \Sigma_{g=1}^s w_g \|S_g\|_2, \tag{5}$$

where $S_g$ is the component corresponding to group g, g= 1, . . . , s, and $w_g$'s are weights associated to each group. The resulting problem formulation is $$(X, S) = \underset{X,S}{\operatorname{argmin}} \|X\|_* + \lambda \|S\|_{2,1}, \tag{6}$$

s.t.

$$B = X + S.$$

Most recent FG/BG separation approaches in the PCA-family are quite effective for image sequences acquired with a stationary camera, and a mostly static background. However, the separation performance degrades for image sequences with a moving camera which may result in apparent motion in the background, even with limited motion jitter. There, a global motion compensation (MC) aligns the images before applying a RPCA-based FG/BG separation method.

With moving camera sequences, the motion in the background no longer satisfies the low-rank assumption. Hence, in order to apply the RPCA, global motion compensation using a homography model can be used in a pre-processing step on the image sequence prior to using the RPCA.

One approach for performing global motion compensation is to compute a homography model for the image sequence. In an 8-parameter homography model $h = [h_1, h_2, \ldots, h_8]^T$, the corresponding pixel $x_1 = (x_1, y_1)^T$ in the current image and $x_2 = (x_2, y_2)^T$ in its reference image are related according to $$x_2 = \frac{h_1 + h_3 x_1 + h_4 y_1}{1 + h_7 x_1 + h_8 y_1} \quad (7)$$

and $$y_2 = \frac{h_2 + h_5 x_1 + h_6 y_1}{1 + h_7 x_1 + h_8 y_1}.$$

Given local motion information associating a pixel location $(x_1, y_1)$ in the current image to its corresponding location $(x_2, y_2)$ in a reference image, the homography model h can be estimated by least square (LS) fitting: b=Ah, where b is a vector composed by stacking the vectors $x_2$'s, and the rows of A corresponding to each $x_2$ is specified as $$A = \begin{pmatrix} 1 & 0 & x_1 & y_1 & 0 & 0 & -x_1 x_2 & -y_1 x_2 \\ 0 & 1 & 0 & 0 & x_1 & y_1 & -x_1 y_2 & -y_1 y_2 \end{pmatrix}. \quad (8)$$

Image sequences with corresponding depth maps are now common, especially with the rapid growth of depth sensors like Microsoft Kinect™ and the advancement of depth estimation algorithms from stereo images. Jointly using depth and color data produces superior separation results. Also, a depth-enhanced can better deal with illumination changes, shadows, reflections and camouflage.

SUMMARY OF THE INVENTION

The embodiments of the invention provide a method for processing a sequence of images. The method uses an algebraic decomposition for solving a background subtraction problem with a novel PCA framework that uses depth-based group sparsity.

The method decomposes the sequence of images, e.g., group of pictures (GOP), in the video into a sum of a low rank component, and a group-sparse foreground component. The low rank component represents the background in the sequence, and the group-sparse component represents foreground moving objects in the sequence.

For videos acquired of a scene with a moving camera, motion vectors are first extracted from the video, e.g., the video is encoded as a bitstream with motion vectors. Then, an associated depth map is combined with the motion vectors to compute a parametric perspective model with fourteen parameters that matches a global motion in every image in the video.

BRIEF DESCRIPTION OF THE DRAWINGS

FIG. 3 is a block diagram of prior art factorized RPCA algorithm; and

FIG. 4 is a block diagram of a depth-weighted group-wise algorithm according to embodiments of the invention.

DETAILED DESCRIPTION OF THE PREFERRED EMBODIMENTS

In the RPCA problem formulation, the video background is assumed to have small variations that can be modeled using a low rank component X. Foreground content, such as, e.g., moving objects, represented by S, are assumed to be sparse and have a different type of motion than the background.

Prior art FG/BG separation algorithms generally do not not incorporate the foreground object structure in the separation.

The embodiments provide a structured group-sparsity based PCA method that can overcome larger variations in the background, e.g., from misalignment in global motion compensation on a sequence acquired by a moving camera.

Depth-Weighted Group-Wise PCA

In practical image sequences, the foreground objects (sparse components) tend to be clustered both spatially and temporally rather than evenly distributed. This observation led to the introduction of group sparsity into RPCA approaches, moving the sparse component into more structured groups.

Our method uses a depth map of the video to define group structures in a depth-weighted group-wise PCA (DG-PCA) method.

In order to deal with structured sparsity, we replace the $l_1$-norm in the factorized RPCA problem with a mixed $l_{2,1}$-norm as defined in equation (5). The $l_{2,1}$-norm is based on a monotonically increasing function of depths in the depth map. The resulting problem is $$(L, R, S, Y) = \underset{L,R,S,Y}{\operatorname{argmin}} \left( \frac{1}{2} \|L\|_F^2 + \frac{1}{2} \|R\|_F^2 + \lambda \|S\|_{2,1} + <Y, E> + \frac{\mu}{2} \|E\|_F^2 \right). \quad (9)$$

Figure 1:
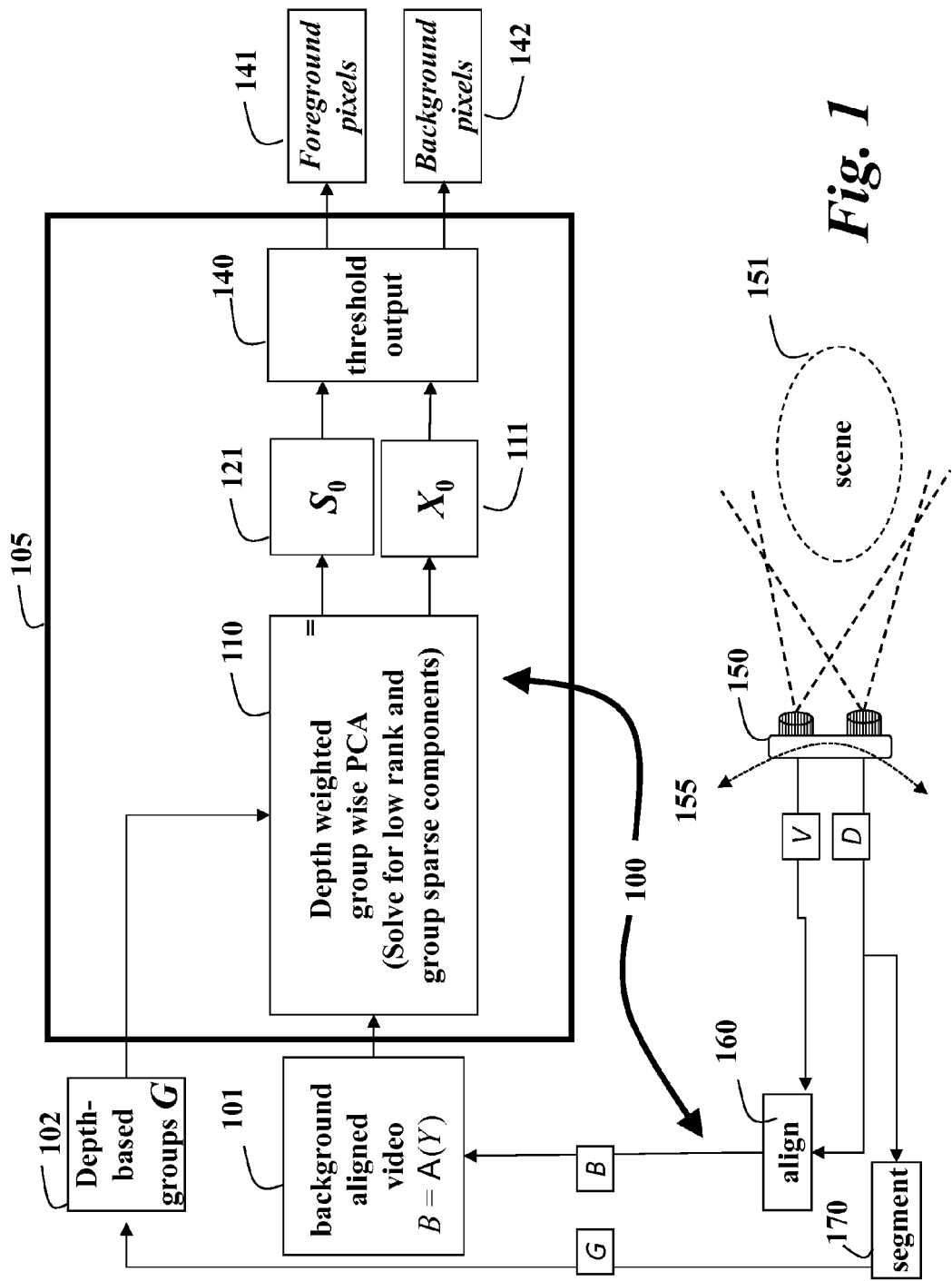
FIG. 1 is a flow diagram of a method for processing a sequence of images according to embodiments of the invention.

FIG. 1 shows a method 105 for separating foreground content from background content in a sequence of images (video). The method uses depth-weighted group-wise PCA (DG-PCA) 110 according to embodiments of the invention. A camera 150 acquires a video V of a real-world scene 151. The camera can be stationary or moving 155. The camera can be a Kinect™ that acquires color images using a color sensor and a depth sensor to acquire a depth map D synchronized with the video.

Figure 2:
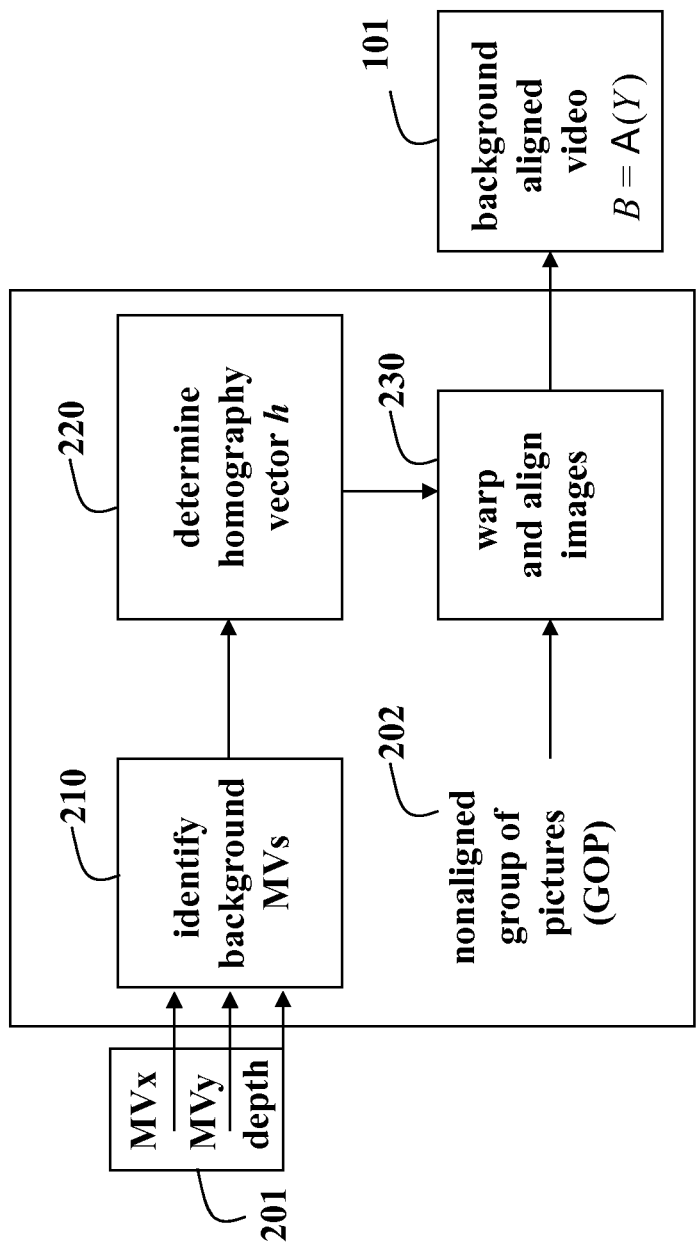
FIG. 2 is a flow diagram aligning and warping images according to embodiments of the invention.

The background in the video can be aligned 160 in a pre-processing step, see FIG. 2. The background aligned video B=A(Y) 101 and depth-based groups of pixels G 102 are input to the method 105. The DG-PCA 110 outputs a low rank component $X_0$ 111 corresponding mainly to background content 111, and a sparse component $S_0$ 121 corresponding mainly foreground content 121. The output step 140 marks pixels in S with a value larger than a predetermined threshold as foreground 141, and other pixels are be marked as background 142. In this case, m is the number of pixels in each frame, i.e. each column of the matrix corresponds to one frame, and n is the number of frames under inspection.

FIG. 4 shows a block diagram of pseudocode for Algorithm 2 describes one preferred embodiment for our DG-PCA approach. The input to the algorithm includes, the background aligned image sequences B 101 and a corresponding depth groups G 102.

In order to define pixel groups G using the depth map D, an operator G(D) segments the depth map into s groups 102 using the following procedure. In one embodiment of the invention, suppose the depth level ranges from 0 to 255, a pixel with depth d is classified into group $$g = \left\lfloor d \left/ \frac{256}{s} \right. \right\rfloor + 1.$$

Consequently, the pixels in B can be clustered into $B_g$ groups with $g \in \{1, \ldots, s\}$. Each $B_g$ is composed of elements from B which is marked into segment g. In the same way, $L_g$, $R_g$, and Lagrangian multiplier $Y_g$ are also grouped.

Next, step 3 and 4 of Algorithm 2 solve for the low rank component (background) using $X = LR^T$.

Next, in step 5 of Algorithm 2, the operator $S_{\lambda/\mu,g}$ is a group-wise soft-thresholding $$S_{\lambda/\mu,g}(r_g) = \max(\|r_g\|_2 - w_g \lambda/\mu, 0) \frac{r_g}{\|r_g\|_2 + \varepsilon}, \quad (10)$$

where $$r_g = B_g - L_g R_g^T + \frac{1}{\mu} Y_g,$$

and $\varepsilon$ is a small constant to avoid division by 0, and $w_g$ defines group weights in equation, (5). Because a foreground object has a higher probability to be nearer to the camera, i.e., to have a larger depth than a background object, we use the following equation to set group weights, $$w_g = c^{1 - \frac{d_g}{255}}, \quad (11)$$

where c is some constant, and $d_g$ is the mean depth of pixels in group g. $w_g$ is equal to 1 for objects nearest to the camera, d=255, and it is equal to c for objects farthest to the camera, d=0. The choice of c controls the a threshold that permits foreground pixels to be selected based on their corresponding depths. After $S_g$ is calculated for each group g, the sparse component S is obtained by summing up all $S_g$.

The above steps are iterated until the algorithm converges, or a maximum iteration number is reached.

The pixels that have large values in S, e.g., larger than a predetermined threshold, are outputted as foreground pixels 141.

The method favors group structures, where the foreground content, e.g., objects, are closer to the camera. It is also possible within our framework to define the groups as the sets of pixels that are spatially connected and have a constant depth, or connected pixels with a constant depth gradient.

It is worthwhile to mention that the nuclear norm equivalent items $$\frac{1}{2}\|L\|_F^2 + \frac{1}{2}\|R\|_F^2$$

in equation (9) make Algorithm 2 numerically stable. Without the nuclear norm, $(I + \mu R_i^T R_i)^{-1}$ in step 3 of Algorithm 2 becomes $(\mu R_i^T R_i)^{-1}$, which is unstable when the matrix $R_i^T R_i$ is singular, for example, when the image is relatively dark with B, L, R≈0.

Depth-Enhanced Homography Model

In practice, the local motion information associating pixel locations is often inaccurate. In this case, the full 8-parameter model in equation (7) is sensitive to errors in the motion information. Hence, a reduced number of parameters in homography model is preferred, thus limiting the types of motion in the scene 151.

For example, 2-, 4- and 6-parameter models correspond to translational only, geometric and affine models, respectively, by setting some coefficients in h to be zero. We select the 4-parameter geometric model as our starting point, where $h = [h_1, h_2, h_3, 0, 0, h_6, 0, 0]^T$.

However, motion in a video sequence is generally not planar. Therefore, even after a careful selection of the conventional homography model, it is possible to have large motion estimation errors, which would dramatically degrade the detection rate in a subsequent PCA-like procedure. Therefore, we use a depth-enhanced homography model. Specifically, six new parameters related to depth are added, and we have $h = [h_1, \ldots, h_8, h_9, \ldots, h_{14}]^T$. Let $z_1$ and $z_2$ stand for the depth of the corresponding pixels, then the corresponding pixel $x_1 = (x_1, y_1, z_1)^T$ in the current image and the pixel $x_2 = (x_2, y_2, z_2)^T$ in its reference image are related by the our depth-enhanced homography model $$x_2 = \frac{h_1 + h_3 x_1 + h_4 y_1 + h_9 z_1}{1 + h_7 x_1 + h_8 y_1}, \quad (12)$$

$$y_2 = \frac{h_2 + h_5 x_1 + h_6 y_1 + h_{10} z_1}{1 + h_7 x_1 + h_8 y_1},$$

$$z_2 = \frac{h_{11} + h_{12} x_1 + h_{13} y_1 + h_{14} z_1}{1 + h_7 x_1 + h_8 y_1}.$$

In equation (12), a depth value 0 means the object is far from the camera, e.g., at ∞. A larger depth means that the object is nearer to the camera. Certain simplification are possible for simpler video sequences. For example, if $z_2 = z_1$, then the motion is be limited to be within the same depth plane.

If the depth-enhanced homography model h is defined as in equation (12), then we can solve the problem using least square fitting. Given local motion information associating a pixel location $(x_1, y_1)$ in the current image and the corresponding location $(x_2, y_2)$ the reference image, the homography model h can be estimated by solving square (LS) fitting: b=Ah, where b is a vector composed by stacking the vectors $x_2$'s, and the rows of A corresponding to each $x_2$ is specified as $$A = \begin{pmatrix} 1 & 0 & x_1 & y_1 & 0 & 0 & -x_1 x_2 & -y_1 x_2 & z_1 & 0 & 0 & 0 & 0 & 0 \\ 0 & 1 & 0 & 0 & x_1 & y_1 & -x_1 y_2 & -y_1 y_2 & 0 & z_1 & 0 & 0 & 0 & 0 \\ 0 & 0 & 0 & 0 & 0 & 0 & 0 & 0 & 0 & 0 & 1 & x_1 & y_1 & z_1 \end{pmatrix}. \quad (13)$$

FIG. 2 shows the steps for aligning 160 the video V using the depth enhanced homography model described above. Input include motion vectors MVx, MVy and depth maps 201. The MVs that are more likely from background are identified 120. Using the selected MVs and the input depth, the homography model parameters h is determined 220, e.g. via least square fitting. A group of images that are un-aligned are taken as input 202, and are aligned by warping 230 using the estimated homography model. Finally, the background aligned image sequence 101 is outputted for further processing 105.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for separating foreground from background in a sequence of images, comprising steps of:
    acquiring the sequence of images and a depth map of a scene by a camera; and
    determining sparsity groups of pixels based on the depth map, wherein the pixels in the sparsity groups are spatially connected and have a constant depth gradient; and
    decomposing, according to an apparent motion in the sequence of images, and the sparsity groups, the sequence of images into a sparse foreground component, and a low rank background component, wherein the steps are performed in a processor connected a memory storing the sequence of images and the depth map.

2. The method of claim 1, wherein the background of images is un-aligned.

3. The method of claim 2, further comprising:
    identifying the background using motion vectors obtained from the sequence of images, and depth obtained from the depth map;
    determining a homographic vector for the background; and
    warping the sequence of images using the homographic vector.

4. The method of claim 3, further comprising:
    determining the homographic vector for a homographic model using least square fitting.

5. The method of claim 3, wherein the homographic vector is depth enhanced, further comprising:
    extending the homography model to a three dimensional model by incorporating the depth map.

6. The method of claim 1, wherein the camera is stationary.

7. The method of claim 2, wherein the camera is moving.

8. The method of claim 1, further comprising:
    thresholding the sparse foreground component.

9. The method of claim 1, further comprising:
    segmenting pixels in the images using the pixels in the depth map.

10. The method of claim 1, wherein the pixels in the sparsity groups are spatially connected and have a constant depth.

11. The method of claim 1, wherein the sequence of images is a group of pictures.

12. The method of claim 1, wherein the decomposition uses a $l_{2,1}$-norm.

13. The method of claim 12, wherein weights in the $l_{2,1}$-norm is based on a monotonically increasing function of depths in the depth map.

14. The method of claim 1, wherein the camera includes a color sensor and a depth sensor.

15. The method of claim 1, wherein the sparsity groups of pixels correspond to objects in the scene at different distances to the camera.

16. The method of claim 1, further comprising:
    combining the depth map with motion vectors to determine a parametric perspective model that matches a global motion in every image in the sequence of images.

17. A system for separating foreground from background in a sequence images, comprising:
    a camera for acquiring the sequence of images and a depth map of a scene;
    a memory storing the sequence of images and a depth map; and
    a processor connected to the memory for determining sparsity groups of pixels based on the depth map, decomposing, according to apparent motion in the sequence of images, and the sparsity groups, the sequence of images into a sparse foreground component, and a low rank background component, wherein the sparsity groups are depth based, and wherein the pixels in the sparsity groups are spatially connected and have a constant depth gradient.

* * * * *